(12) United States Patent
Hawkes et al.

(10) Patent No.: US 9,075,863 B2
(45) Date of Patent: Jul. 7, 2015

(54) SYSTEMS AND METHODS FOR MANAGING BUSINESS OBJECTS

(75) Inventors: Brad Hawkes, Morisset (AU); Gary Fuller, North Parramatta (AU); Matt Palme, Sydney (AU); Ben Coleman, Sydney (AU)

(73) Assignee: Honeywell International Inc., Morristown, NJ (US)

( * ) Notice: Subject to any disclaimer, the term of this patent is extended or adjusted under 35 U.S.C. 154(b) by 188 days.

(21) Appl. No.: 12/994,730

(22) PCT Filed: May 22, 2009

(86) PCT No.: PCT/AU2009/000640
§ 371 (c)(1),
(2), (4) Date: Nov. 24, 2010

(87) PCT Pub. No.: WO2009/143557
PCT Pub. Date: Dec. 3, 2009

(65) Prior Publication Data
US 2011/0093512 A1    Apr. 21, 2011

(30) Foreign Application Priority Data

May 29, 2008 (AU) .............................. 2008902725

(51) Int. Cl.
*G06F 7/00* (2006.01)
*G06F 17/30* (2006.01)
*G06F 13/14* (2006.01)

(52) U.S. Cl.
CPC .... *G06F 17/30607* (2013.01); *G06F 17/30286* (2013.01)

(58) Field of Classification Search
CPC .......................... G06F 17/30607; G06Q 10/10
USPC ......... 707/602, 737, 757, 802, 694, 717, 783, 707/791, 822–823, E17.044, 803, 999.101; 719/310, 313–315, 320, 328, 330; 717/108, 113–116, 171; 235/380; 705/31–38; 709/225–229

See application file for complete search history.

(56) References Cited

U.S. PATENT DOCUMENTS

| | | | |
|---|---|---|---|
| 6,754,665 B1 * | 6/2004 | Futagami et al. | ..................... 1/1 |
| 6,917,930 B1 | 7/2005 | Brodale et al. | |
| 7,072,934 B2 | 7/2006 | Helgeson et al. | |
| 8,402,060 B2 * | 3/2013 | Elad et al. | ..................... 707/791 |
| 2005/0198615 A1 | 9/2005 | Choi et al. | |
| 2005/0268277 A1 | 12/2005 | Reeder et al. | |
| 2006/0143193 A1 | 6/2006 | Thakkar et al. | |
| 2007/0050349 A1 * | 3/2007 | Schreter | .............................. 707/4 |
| 2007/0179827 A1 * | 8/2007 | Gupta et al. | ...................... 705/8 |
| 2007/0226751 A1 * | 9/2007 | Brendle et al. | ................ 719/313 |
| 2007/0288891 A1 | 12/2007 | Aakolk et al. | |

* cited by examiner

*Primary Examiner* — Usmaan Saeed
*Assistant Examiner* — Cecile Vo
(74) *Attorney, Agent, or Firm* — Brooks, Cameron & Huebsch, PLLC

(57) ABSTRACT

Described herein are systems and methods for managing business objects. In overview, various embodiments provide software, hardware and methodologies underlying a data driven application including a data driven business layer, optionally in combination with a data driven user interface and presentation layer. In overview, an object-oriented computer program includes a presentation layer, a business layer, and a database. The business layer provides business objects, which effectively interpose the presentation layer with the database. Substantive business object data is defined within the database, and loaded to the business layer following the receipt of a page call-up request at the presentation layer.

17 Claims, 6 Drawing Sheets

SYSTEMS AND METHODS FOR MANAGING BUSINESS OBJECTS

This patent application is a nationalization under 35 U.S.C. 371 of PCT/AU2009/000640, filed May 29, 2009 and published as WO 2009/143557 A1 on Dec. 3, 2009, which claims priority benefit under 35 U.S.C. 119 of Australia Patent No. 2008902725, filed May 29, 2008, which applications and publication are incorporated herein by reference in their entirety.

FIELD OF THE INVENTION

The present invention relates to systems and methods for managing business objects, and more particularly to a data driven application including a presentation layer and a business layer. Embodiments of the invention have been particularly developed to provide flexibility to the manner by which business objects are defined. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Object-oriented computer programs make use of business objects for representing aspects or items that the program is intended to support. For example, business objects may be defined to describe the likes of employees, invoices, access control cards, and so on. Generally speaking, business objects are defined within a business layer, which interposes a presentation layer, which is responsible for the delivery of a user interface to a client, with a back-end database.

Modification and/or addition of business objects in the business layer is typically a complex task. As such, once a business object is defined, there is limited scope for flexibility to modify the business object (for example where there is a desire to modify an existing business object to include one or more new fields, rules or methods). This can be particularly inhibiting where a desire exists to implement a given application in multiple business environments, or where a business environment changes over time.

SUMMARY OF THE INVENTION

It is an object of the present invention to overcome or ameliorate at least one of the disadvantages of the prior art, or to provide a useful alternative.

One embodiment provides a method for managing business objects, the method including the steps of:
(a) receiving, from a client terminal, data indicative of a page call-up request;
(b) identifying a business object associated with the page call-up request;
(c) loading, from a database to a business layer, substantive data for the business object;
(d) instantiating the business object, via the business layer, based on the substantive data;
(e) performing a page layout procedure for a page that communicates with the business object; and
(f) providing, in response to the page call-up request, page data for rendering at the client terminal, wherein the page data allows the client terminal to interface with the business object.

One embodiment provides a computer program product for performing a method as discussed herein.

One embodiment provides a computer readable medium carrying a set of instructions that, when executed by one or more processors, cause the one or more processors perform a method as discussed herein.

One embodiment provides a computer system including one or more processors configured to perform a method as discussed herein.

One embodiment provides a computer program architecture including:
a business layer for providing one or more business objects, the business objects interfacing the business layer with a respective one or more values in a database; and
a presentation layer for providing to a client terminal page data, wherein the page data allows the client terminal to interface with at least one of the business objects provided by the business layer;
wherein, for at least one of the business objects, substantive data for that business object is maintained in the database, and wherein the substantive data is loaded to the business layer in response to a page call-up request received via the presentation layer.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments of the invention will now be described, by way of example only, with reference to the accompanying drawings in which.

DETAILED DESCRIPTION

Described herein are systems and methods for managing business objects. In overview, various embodiments provide software, hardware and methodologies underlying a data driven application including a data driven business layer, optionally in combination with a data driven user interface and presentation layer. In overview, an object-oriented computer program includes a presentation layer, a business layer, and a database. The business layer provides business objects, which effectively interface the presentation layer with the database. Substantive business object data is defined within the database, and loaded to the business layer following the receipt of a page call-up request at the presentation layer.

System Overview

Figure 1:
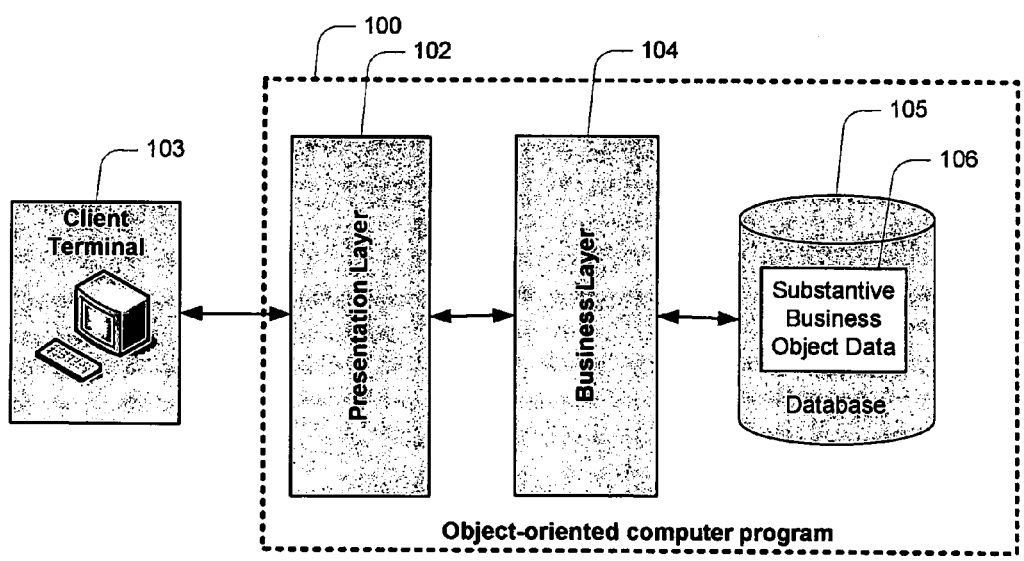
FIG. 1 schematically illustrates a computer program according to one embodiment.

FIG. 1 provides a schematic overview of an object oriented computer program 100 according to one embodiment. Program 100 includes a presentation layer 102, which is responsible for delivering to client terminals, such as a client terminal 103, page data for allowing a user to interact with program 100. For example, in some embodiments the presentation layer makes use of an ASP.NET framework. The presentation layer in this manner provides presentation data which allows for the rendering on-screen at client terminal 103 a user interface, and value data, which is presented via the user interface.

Presentation layer 102 communicates with a business layer 104, this business layer effectively interposing the presentation layer with data maintained in a database 105. As is commonly the case in an object-oriented environment, business layer 104 makes use of business objects. These business objects interface client terminal 103 with database 105, via presentation layer 102 and business layer 104. For example, a page item displayed at the client terminal interfaces with a business object for the purpose of presenting at the client terminal a value stored in database 105. In one embodiment, a class of business objects is used to describe employees. An object of this class is configured to describe an employee, for example in terms of a plurality of data fields for maintaining data indicative of name, address, position, and so on. At runtime, an instance of such a business object allows for the binding of data at the client terminal with corresponding data in the database. This binding is based on a binding protocol, which may be bidirectional or unidirectional.

Traditionally, business objects are statically defined in the business layer. However, in the present embodiments, an alternative approach is adopted. In particular, substantive business object data 106 is maintained in database 105. As discussed in more detail further below, this allows for flexible business object definitions. For example, the modification of a business object definition is able to be achieved by way of database operations.

Method Overview

Figure 2A:
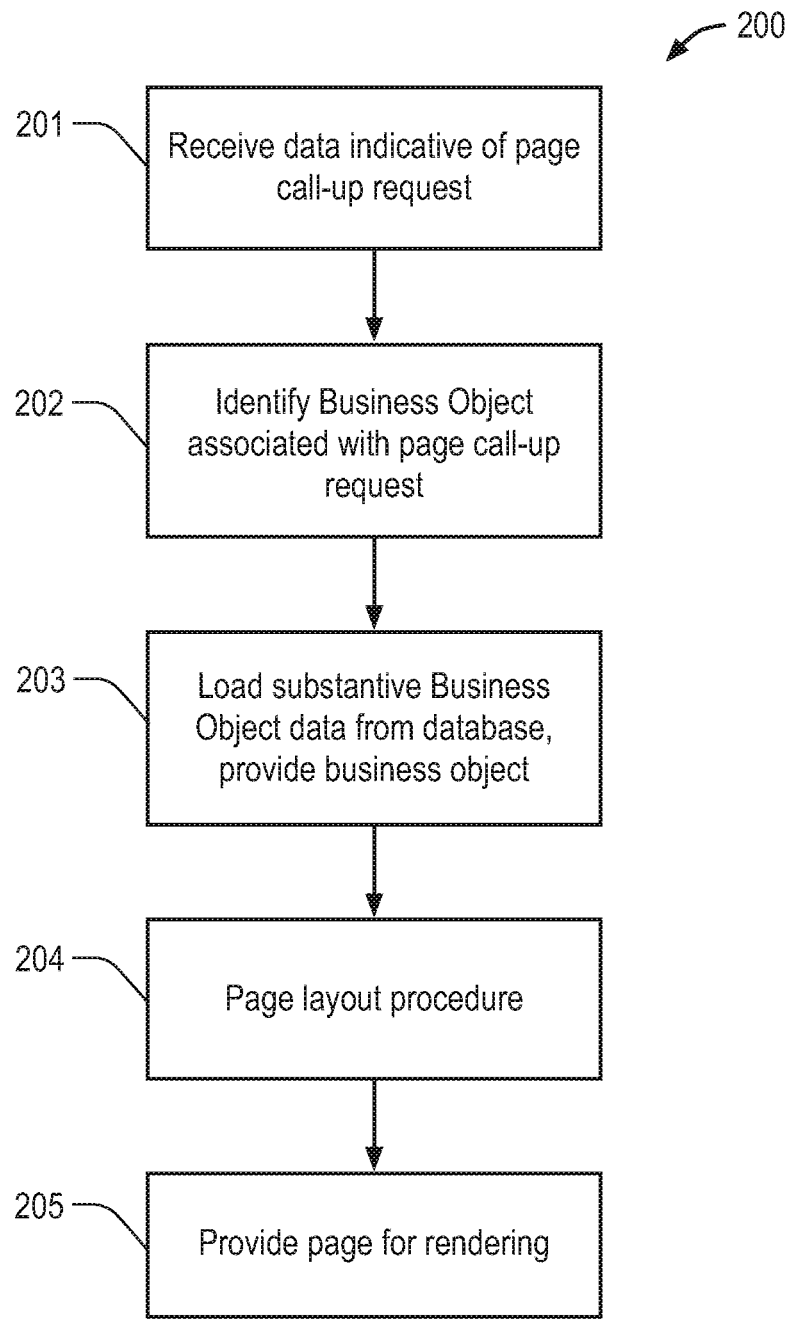
FIG. 2A illustrates a method according to one embodiment.

FIG. 2A illustrates a method 200 according to one embodiment. This method is performable on the basis of software instructions that describe program 100. For example, these instructions may be maintained on a carrier medium (such as a memory module or portable media) and executed via one or more processors of a computer system (or, in some cases, a distributed computer system).

Step 201 includes receiving data indicative of a page call-up request. This data is received at the presentation layer subject to activity at a client terminal. For example, the client terminal executes a browser-based application for rendering on-screen a user interface for program 100, and the page call-up request stems from a user's interaction with the user interface.

Step 202 includes identifying a business object associated with the page call-up request. For example, in some embodiments the page call-up request is indicative of one or more descriptors, and a business object (or, in some cases, a plurality of business objects) is identifiable on the basis of the descriptors.

Step 203 includes loading from the database substantive business object data. Following step 203, the business layer instantiates the relevant business object. The term "instantiates" is used in the sense that the business object is placed in an operational state and is functionally operational based on the loaded data for that business object, such that an appropriately configured page item is able to interface with the business object based on the loaded data.

Step 204 includes a page layout procedure. In overview, this process allows the identification and configuration of one or more page items for rendering at the client terminal. The one or more page items interface with the business object. For example, in a simple case the page item displays a value based on data provided by the business object (optionally corresponding to or being based upon data in the database).

Step 205 includes providing page data for rendering at the client terminal. This is essentially the response to the page call-up request received at step 201. The page data allows the client terminal to interface with the business object.

Identification of Business Objects

As foreshadowed, step 201 includes receiving data indicative of a page call-up request. In broad terms, a page call-up request may originate in response to actions of a user of a client terminal. For example, the user clicks a button on the page, passes the cursor over a particular region, or the like. In the present embodiments given action is indicative of either or both of one or more descriptors and a destination. The purpose of descriptors is to allow the identification of one or more relevant business objects. For the present purposes, predominately for ease of description, we deal with the situation where only a single business object is identified.

The manner by which business objects are identified on the basis of descriptors varies between embodiments. Two particular examples are considered below.

Metadata-Based Identification

In some embodiments, business objects are identifiable on the basis of basic business object data maintained in a business layer directory. This directory provides metadata for allowing the identification of a business object (for example, based on a unique identifier) on the basis of one or more descriptors.

Figure 2B:
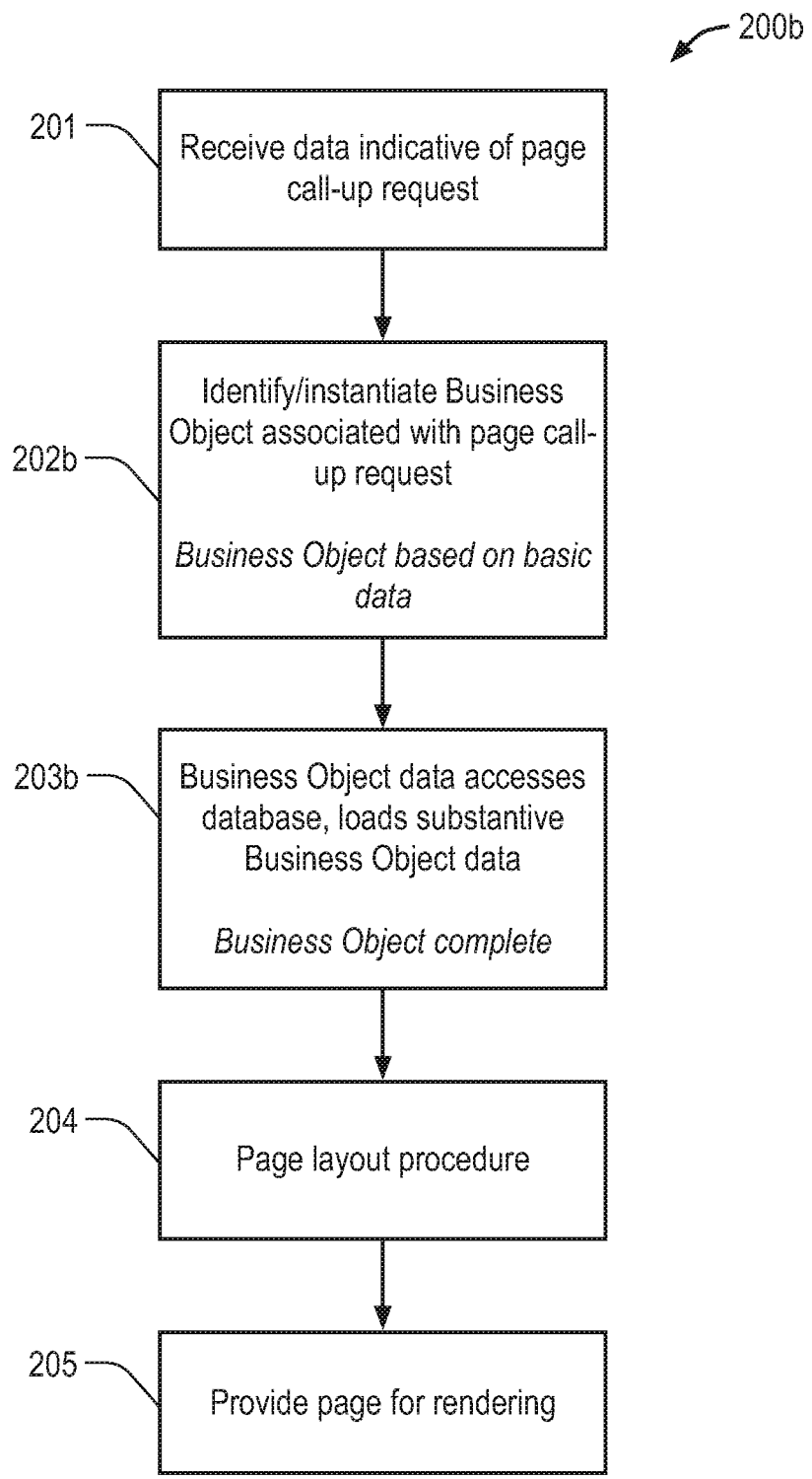
FIG. 2B illustrates a method according to one embodiment.

Referring to FIG. 2B, method 200b provides a variation on method 200 wherein metadata-based identification is used. Step 202b includes, on the basis of the one or more descriptors provided via the page call-up request, querying the directory of basic business object data. This allows an appropriate business object to be identified on the basis of metadata. A generic business object is then preliminarily instantiated on that basis. The business object in question contains very little information/functionality at this point in time. Rather, it provides a general framework for allowing the loading of substantive business object data, thereby to provide a functional business object.

At step 203b, the preliminarily instantiated business object accesses the database and identifies, based on metadata, its substantive business object data. The business object then loads this data, and in doing so essentially "loads itself", thereby to instantiate a business object based on the substantive data. In this case, the "instantiation" may simply be a modification of the preliminarily instantiated business object. At this point in the process, the business layer is able to provide the "complete" business object.

Database Identification

Figure 2C:
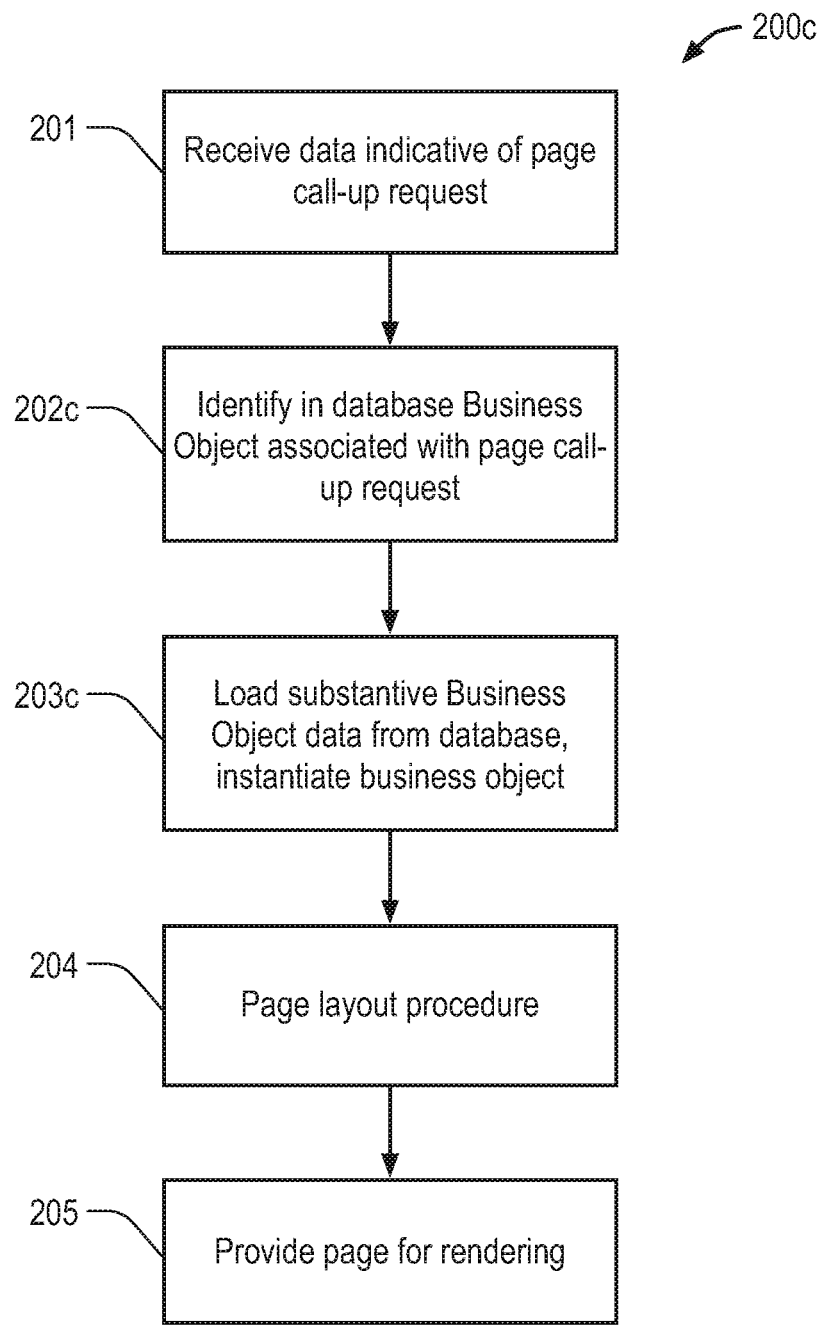
FIG. 2C illustrates a method according to one embodiment.

In the example of FIG. 2C, method 200c illustrates a process whereby the business layer utilizes descriptors to query the database, thereby to identify an appropriate business object.

Step 202c includes, on the basis of the page call-up request, querying the database to identify an appropriate business object. In some embodiments, this in itself requires the utilization of a business object, which is optionally from the outset instantiated on the basis of information in the business layer. Step 203c includes loading substantive business object data from the database for the identified business object. This data is then used to instantiate the business object, which subsequently becomes functional in the business layer based on the substantive business object data loaded from the database.

Substantive Business Object Data

Various embodiments described herein deal with the notion of "substantive business object data". The general notion is that such data is maintained in the database until such a time as a business object is required by the presentation layer. At that point in time, the substantive data is loaded to the business layer. In general terms, the substantive business object data includes one or more properties for the business object, and one or more business rules for the business object. Additional aspects of data may also be included, as discussed further below.

Properties define a relationship between a business object and the database, particularly in terms of tables in the database with which the business object interfaces, and binding rules between the business object and those tables. For example, in one embodiment, a business object is used as a mechanism for providing cardholder information (name, age, permissions, etc) to the presentation layer. The properties for the business object allow the business object to identify appropriate values in the database corresponding to the relevant cardholder information.

Business rules define the operation of a business object. In the present embodiments, occurrences in the context of the program are flagged in terms of "events". For example, an event may be triggered by the modification of a value in the database, a post-back event initiated at the client terminal, and so on. Business rules are responsible for the likes of validating values and types, propagating data, flagging further events, and so on. By way of example, a user may change a cardholder's date of birth via a user interface provided at a client terminal. This change fires an event, to which a business object for that cardholder is responsive in accordance with its business rules. For example, the date is validated to confirm that it is a correct date, subject to which the change may be rolled-back, or another event triggered. This other event may trigger a further business rule to verify whether the resulting age is permissible, and so on. In some cases, a business rule results in the generation of a global event, to which other business objects might be responsive. For example, once a change in date of birth is validated and implemented (for example by updating a value in the database), a global event is triggered, such that another concerned business object is made aware of the change, and able to perform further functions in accordance with its own business rules.

Substantive data may also include permissions, which define rules for determining whether a particular user/client terminal has permission to perform certain actions/operations. For instance, continuing the example of a cardholder date of birth, a first user may have permission to change a date of birth, whereas a second may only have permission to view a date of birth, and a third might not have permission to view or change a date of birth.

In some embodiments, substantive data additionally includes methods and other functionalities provided by business objects. For example, a business object may be called to perform a certain method. In further embodiments, the substantive data includes details of children objects for the business object.

There are significant advantages associated with the present approach of maintaining substantive business object data in the database. In particular, business objects, which are typically inherently static in definition, are able to be modified by way of database operations. For example, consider a situation where a "cardholder" business object is defined, this business object having fields associated with name, date of birth, and so on. Assume there is a desire to include an additional field for "commission status", describing a value that is specific to a particular implementation. In a conventional implementation, this would require substantive modification of the business layer. However, by way of the present data-driven approach, the process includes updating the database to reflect updated properties for the relevant business object. When that business object is next instantiated, it will load on the basis of the updated properties.

In some embodiments additional changes are also made in relation to display data corresponding to a modified business object. This is described further below.

Page Layout Procedure

Figure 3:
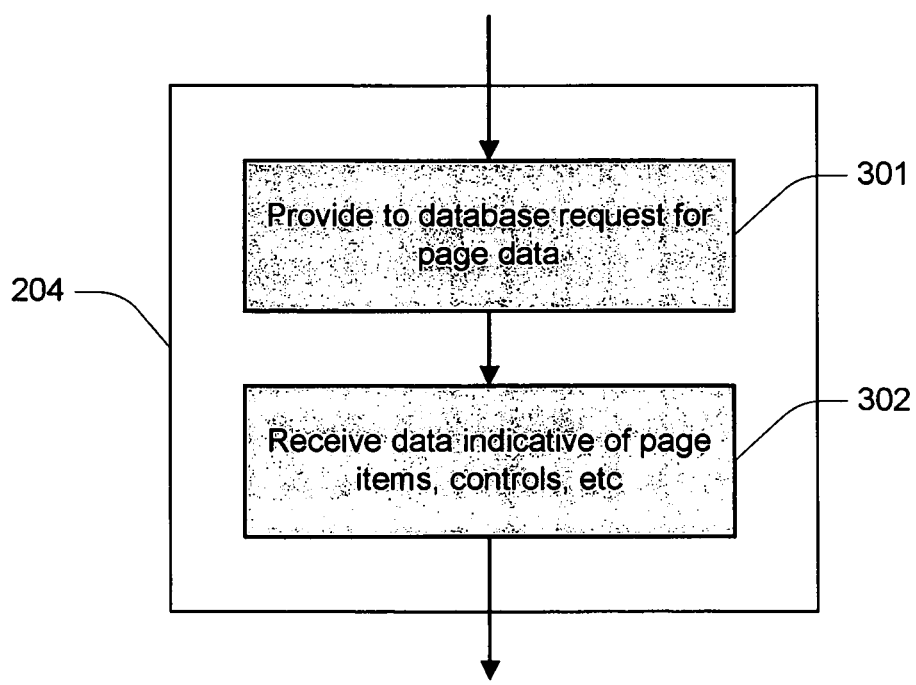
FIG. 3 illustrates a method according to one embodiment.

As foreshadowed, step 204 includes performing a page layout procedure. FIG. 3 illustrates step 204 in more detail, according to one embodiment. In overview, step 301 includes providing to the database a request for page data, and step 302 includes receiving data indicative of page items, controls, and the like.

Figure 4:
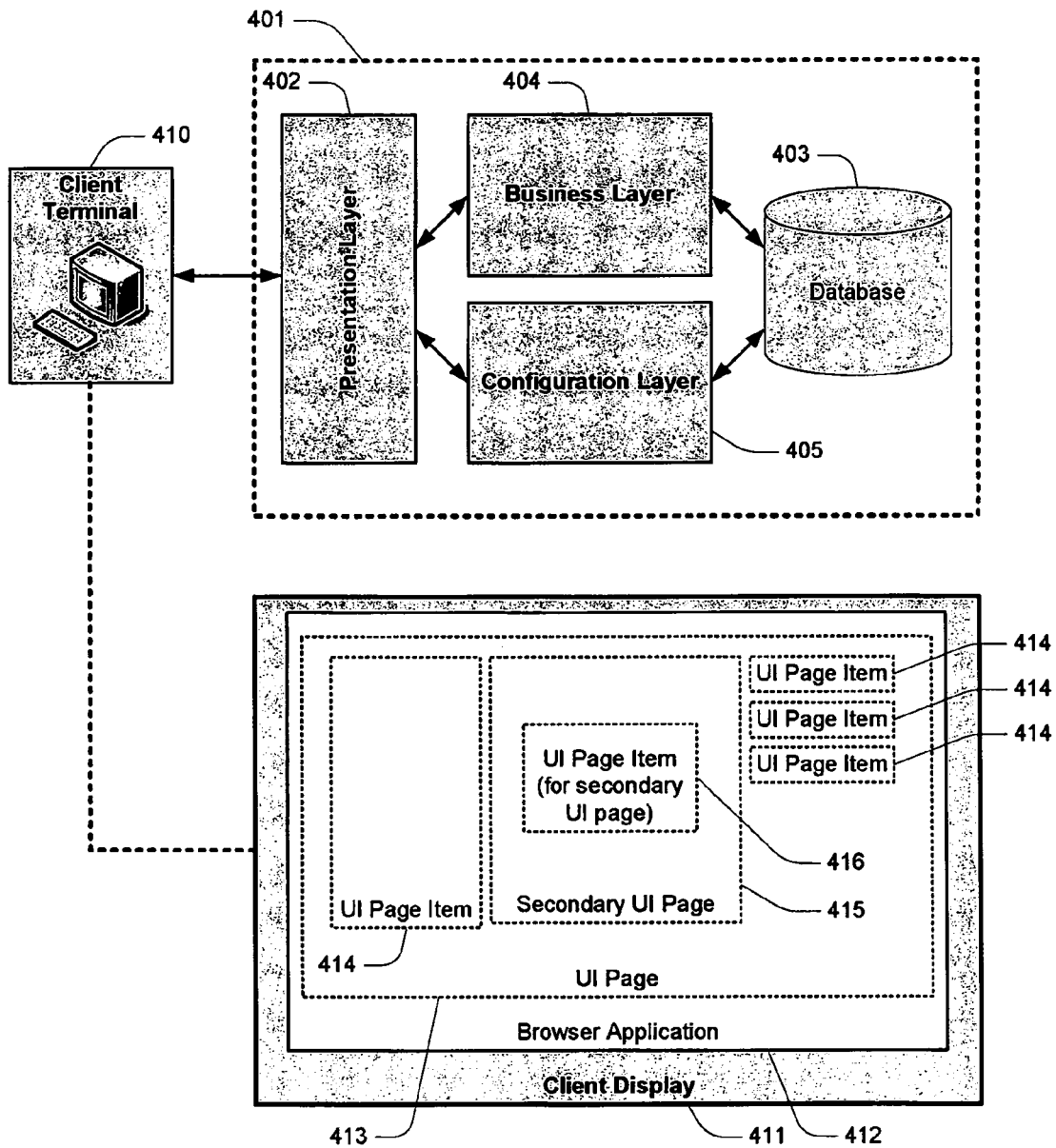
FIG. 4 schematically illustrates a computer program according to one embodiment.

In the present embodiments, a configuration layer interposes the presentation layer and the database for the purposes of step 204, as shown in the schematic illustration of FIG. 4.

FIG. 4 illustrates an exemplary architecture according to one embodiment. A program 401 includes a presentation layer 402 and a database 403. A business layer 404 provides business objects for interposing the presentation layer 402 and database 403, these business objects being provided on the basis of substantive business object data loaded from the database in response to a page call-up request, as discussed above. A configuration layer 405 interposes the presentation layer 402 and database 403 for the purpose of obtaining page data from the database. This page data is processed at the presentation layer and provided for rendering at a client terminal 410.

FIG. 4 also illustrates an exemplary user interface, as rendered at client terminal 410. A client display 411 shows rendered on-screen a browser application 412. This browser application provides a user interface (UI) page 413. UI page 413 includes a plurality of UI page items 414. A further UI page 415 is additionally embedded within page 412, this embedded page having a respective page item 416.

In the present example, each UI page is associated with a respective business object provided by business layer 404. However, in other embodiments, there is other than a one-to-one relationship between UI pages and business objects. For example, in some embodiments a single UI page operates in conjunction with a plurality of business objects.

In overview, the configuration layer is responsive to data indicative of a business object identified on the basis of a page call-up request for identifying one or more pages for the business object. This procedure is similar to the identification of business objects, in the sense that a directory-based identification or database identification may be implemented. An appropriate page may be identified on the basis of data stemming from the page call-up request (for example where the request identifies a destination) and/or on the basis of present context data (for example a current page is of a particular type, and the page identified by the configuration layer is of a similar type. The configuration layer then loads, from the database, appropriate page data. This page data is provided to the presentation layer, and subsequently made available for rendering the client terminal.

Page data includes, for each page item, page item properties. These properties in some cases define how a page item interacts with its business object. For example, a page item might display a read-only representation of a value provided by a business object. Page data may also include custom controls for page items.

With both substantive business object data and page data being maintained in the database, it is possible to not only modify business objects by way of database operations, but additionally to modify the uses for those business objects by way of database operations. Such a data-driven user interface provides for a high degree of customization in program 400.

CONCLUSIONS

It will be appreciated that the disclosure above provides various significant systems and methods for managing business objects. In particular, by maintaining substantive data for business objects and/or pages in the database, these are able to be easily modified thereby to provide a flexible program infrastructure.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for managing business objects, the method including:
   receiving, from a client terminal, data indicative of a page call-up request;
   identifying a business object by querying a cache of basic business object data maintained in the business layer for identifying the business object associated with the page call-up request, the identifying a business object performed using a processor to execute instructions;
   loading, from a database to a business layer, wherein the database is separate from the business layer, substantive data for the business object, wherein the substantive data for the business object includes:
one or more properties for the business object that define a relationship between the business object and the database;
one or more business rules for the business object that define operation of the business object;
one or more permissions for the business object that define rules for determining whether the client terminal has permission to change personal information of a cardholder; and
one or more methods performed by the business object;
instantiating the business object, via the business layer, based on the substantive data;
modifying the business object, wherein the modification includes adding one or more properties to the business object or deleting one or more properties from the business object;
loading the business object from the database to the business layer based on the modification when the business object is next instantiated;
performing a page layout procedure for a page that communicates with the business object; and
providing, in response to the page call-up request, page data for rendering at the client terminal, wherein the page data allows the client terminal to interface with the business object.

2. The method according to claim 1 including preliminarily instantiating the business object in the business layer on the basis of basic business object data maintained in the cache, and wherein the preliminarily instantiated business object is responsible for the loading, thereby to allow the instantiation of the full business object.

3. The method according to claim 1 wherein the basic business object data includes metadata for identifying the substantive data for the business object in the database.

4. The method according to claim 1 wherein identifying the business object includes querying the database for identifying the business object, and wherein the business object is instantiated in the business layer following the loading of the substantive data.

5. The method according to claim 1 wherein the substantive data for the business object includes a binding definition for the business object.

6. The method according to claim 1 wherein performing the page layout procedure includes obtaining from the database data indicative of a page item for interfacing with the business object.

7. A non-transitory computer readable medium having stored thereon a set of instructions that, when executed by one or more processors, cause the one or more processors to perform operations comprising:
receiving, from a client terminal, data indicative of a page call-up request;
identifying a business object by querying a cache of basic business object data maintained in the business layer for identifying the business object associated with the page call-up request, the identifying a business object performed using a processor to execute instructions;
loading, from a database to a business layer, wherein the database is separate from the business layer, substantive data for the business object, wherein the substantive data for the business object includes:
one or more properties for the business object that define a relationship between the business object and the database;
one or more business rules for the business object that define operation of the business object;
one or more permissions for the business object that define rules for determining whether the client terminal has permission to change personal information of a cardholder; and
one or more methods performed by the business object;
instantiating the business object, via the business layer, based on the substantive data;
modifying the business object, wherein the modification includes adding one or more properties to the business object or deleting one or more properties from the business object;
loading the business object from the database to the business layer based on the modification when the business object is next instantiated;
performing a page layout procedure for a page that communicates with the business object; and
providing, in response to the page call-up request, page data for rendering at the client terminal, wherein the page data allows the client terminal to interface with the business object.

8. The non-transitory computer-readable medium according to claim 7 wherein identifying the business object includes querying a cache of basic business object data maintained in the businesses layer for identifying the business object.

9. The non-transitory computer-readable medium according to claim 8 wherein the operations further include preliminarily instantiating the business object in the business layer on the basis of basic business object data maintained in the cache, and wherein the preliminarily instantiated business object is responsible for the loading, thereby to allow instantiation of the full business object.

10. The non-transitory computer-readable medium according to claim 8 wherein the basic business object data includes metadata for identifying the substantive data for the business object in the database.

11. The non-transitory computer-readable medium according to claim 7 wherein identifying the business object includes querying the database for identifying the business object, and wherein the business object is instantiated in the business layer following the loading of the substantive data.

12. The non-transitory computer-readable medium according to claim 7 wherein the substantive data for the business object includes a binding definition for the business object.

13. The non-transitory computer-readable medium according to claim 7 wherein performing the page layout procedure includes obtaining from the database data indicative of a page item for interfacing with the business object.

14. A computer system including:
one or more processors and one or more memories;
a business layer stored in the one or more memories and executable by the one or more processors, the business layer maintaining a cache of basic business object data, the cache of basic business object data for providing one or more business objects, the business objects interfacing the business layer with a respective one or more values in a database, wherein the database is separate from the business layer; and
a presentation layer for providing to a client terminal page data, wherein the page data allows the client terminal to interface with at least one of the business objects provided by the business layer;
wherein, for at least one of the business objects, substantive data for that business object is maintained in the database, wherein the substantive data for that business object includes one or more properties for that business object that define a relationship between that business object and the database, one or more business rules for that business object that define operation of that business object, one or more permissions for that business object that define rules for determining whether the client terminal has permission to change personal information of a cardholder, and one or more methods performed by the business object, wherein the properties for the business object are modified, wherein the modification includes adding one or more properties to the business object or deleting one or more properties from the business object and wherein the business object is loaded from the database to the business layer based on the modification when the business object is next instantiated, and wherein the substantive data is loaded to the business layer in response to a page call-up request received via the presentation layer.

15. The computer system according to claim 14 wherein the business layer maintains a cache of business object metadata.

16. The computer system according to claim 15 wherein, in response to the page call-up request, the business layer identifies and preliminarily instantiates a business object on the basis of the metadata.

17. The computer system according to claim 16 wherein the preliminarily instantiated business object queries the database to load its respective substantive business object data, thereby to instantiate the business object based on the substantive business object data.

* * * * *